United States Patent

[11] 3,579,820

[72] Inventor Paul Hini
Erlangen, Germany
[21] Appl. No. 862,547
[22] Filed June 24, 1969
Division of Ser. No. 665,928, Sept. 6, 1967, Pat. No. 3,490,070.
[45] Patented May 25, 1971
[73] Assignee Siemens Aktiengesellschaft
Berlin, Germany

[54] METHOD OF MAKING GALVANOMAGNETIC RESISTOR UTILIZING GRID FOR SHORT-CIRCUITING HALL VOLTAGE
7 Claims, 4 Drawing Figs.

[52] U.S. Cl. .......... 29/610, 29/621
[51] Int. Cl. .......... H01c 17/00
[50] Field of Search .......... 29/610, 620, 621, 589; 338/32, 206, 208, 314

[56] References Cited

UNITED STATES PATENTS

| | | | |
|---|---|---|---|
| 2,894,234 | 7/1959 | Weiss et al. | 338/32 |
| 3,267,405 | 8/1966 | Weiss et al. | 338/32 |
| 3,331,045 | 7/1967 | Weiss et al. | 338/32 |
| 3,335,384 | 8/1967 | Weiss | 338/32X |
| 3,436,817 | 4/1969 | Lane | 29/610X |

*Primary Examiner*—John F. Campbell
*Assistant Examiner*—Victor A. DiPalma
*Attorneys*—Curt M. Avery, Arthur E. Wilfond, Herbert L. Lerner and Daniel J. Tick

ABSTRACT: A metal grid is placed on the surface of a semiconductor layer for short-circuiting Hall voltage in the semiconductor layer. The semiconductor layer is placed on a carrier plate with the grid interposed between the semiconductor layer and the carrier plate.

METHOD OF MAKING GALVANOMAGNETIC RESISTOR UTILIZING GRID FOR SHORT-CIRCUITING HALL VOLTAGE

The present application is a division of application Ser. No. 665,928, filed Sept. 6, 1967, now U.S. Pat. No. 3,490,070, and entitled "GALVANOMAGNETIC RESISTOR UTILIZING GRID FOR SHORT-CIRCUITING HALL VOLTAGE AND METHOD OF MAKING SUCH RESISTOR."

DESCRIPTION OF THE INVENTION

The present invention relates to a galvanomagnetic resistor and to a method of making such resistor. More particularly, the invention relates to a galvanomagnetic resistor in which a metal grid on the surface of a semiconductor layer is utilized to short circuit Hall voltage in such semiconductor layer, and the method of making same.

A metal grid, lattice, raster or array of spaced metal conductors or strips may be placed on the surface of a galvanomagnetic semiconductor body or field plate. The grid, raster or the like comprises a plurality of spaced parallel strips positioned perpendicularly to the direction of the current flowing through the field plate. This is discussed in U.S. Pat. No. 2,894,234. In a field plate which is positioned in a magnetic field which is oriented perpendicularly to current flowing through the plate and to the strips on the plate, such strips function to short circuit the Hall voltage. The Hall voltage is short-circuited at least partially by the metal grid and thereby considerably augments the existing galvanomagnetic properties of the semiconductor resistor.

The aforedescribed method of increasing the magnetically effected variation in resistance in a semiconductor resistor is especially significant in a semiconductor body which contains inclusions of good electrical conductivity. The inclusions are oriented approximately parallel to each other and to the grid. The inclusions may comprise, for example, needle-shaped nickel antimonide. A description of the inclusions may be found in Zeitschrift fur Physik, Vol. 176, 1963, p. 399 to 408.

A field plate utilizes a carrier plate for the semiconductor layer. The carrier plate usually comprises a ceramic, ferrite or other ferromagnetic and electrically conducting material. The carrier plate must be sufficiently insulated from the semiconductor layer.

In known field plates utilizing metal grids, a semiconductor layer is placed on a carrier plate and the grid is then placed on the free surface of the semiconductor layer or that surface of the semiconductor layer which is farthest from the carrier plate. The grid is affixed to the semiconductor layer by any suitable means such as, for example, alloying, adhesive, electrolysis or from a vapor phase. A primary difficulty with such field plates is, however, that after a period of time, the grid loosens and may become completely separated from the semiconductor layer. This is due to temperature fluctuations and/or mechanical shocks. A possible exception to this occurrence is an alloyed grid; that is, a grid which is alloyed with the semiconductor layer. A difficulty involved in alloying the grid and the semiconductor layer is that during the alloying process the adhesion between the semiconductor layer and the carrier plate is damaged or weakened due to the temperature required for alloying the grid to the semiconductor layer. Furthermore, upon completion of the alloying process, it is preferably to etch the finished semiconductor bearing the grid in order to adjust the electrical resistance thereof to a determined or standard magnitude. The grid may be weakened during such etching to the extent that its short-circuiting effect on the Hall voltage is considerably diminished.

The principal object of the present invention is to provide a new and improved galvanomagnetic resistor. The galvanomagnetic resistor of the present invention utilizes a metal grid and functions as a field plate. The galvanomagnetic resistor of the present invention is not subject to the disadvantages of the similar resistors of the prior art. The grid of the galvanomagnetic resistor of the present invention is not adversely effected by temperature fluctuations or mechanical shocks and may be etched without adverse effect after it is placed on the semiconductor layer. The galvanomagnetic resistor of the present invention is efficient, effective and reliable in operation. The method of making the galvanomagnetic resistor of the present invention is simple and may be undertaken with facility and efficiency. The galvanomagnetic resistor of the present invention may be readily, facilely and thoroughly cleaned at the surface bearing the grid.

In accordance with the present invention, a galvanomagnetic resistor comprises a carrier plate having a surface. A semiconductor layer is placed on the carrier plate. The semiconductor layer has a surface facing the surface of the surface of the carrier plate. A metal grid is placed on the surface of the semiconductor layer for short-circuiting Hall voltage in the semiconductor layer. The grid is interposed between the semiconductor layer and the carrier plate. The semiconductor layer has another surface, and the other surface of the semiconductor layer is polished. The semiconductor layer includes a plurality of inclusions of good electrical conductivity oriented approximately parallel to each other and to the grid. The grid comprises a plurality of spaced substantially parallel metal strips.

The method of the present invention for making a galvanomagnetic resistor comprises mounting a semiconductor layer on a carrier plate with a metal grid on the semiconductor layer interposed between the semiconductor layer and the carrier plate. The grid is on a surface of the semiconductor layer facing the carrier plate and the semiconductor layer has another surface which is then polished or etched. The grid may be alloyed with the semiconductor layer.

The metal grid is first placed on the semiconductor layer and the semiconductor layer is then placed on the carrier plate with the grid interposed between the semiconductor layer and the carrier plate. The semiconductor layer is polished or etched to a desired thickness at its free surface. After polishing of the semiconductor layer, terminal electrodes are affixed to the semiconductor layer. The polished semiconductor layer is dipped into an etching solution. The semiconductor layer is immersed in a constant temperature chemically neutral bath and the electrical resistance of the semiconductor layer is measured after dipping while in the bath. The dipping into an etching solution and measuring the electrical resistance are alternately repeated until the electrical resistance reaches a determined magnitude.

In order that the present invention may be readily carried into effect, it will now be described with reference to the accompanying drawing, wherein.

Figure 1:
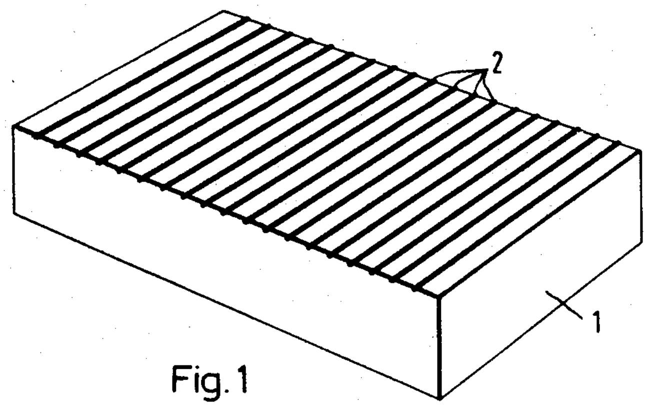
FIG. 1 is a perspective view of a semiconductor layer with a metal grid placed on a surface thereof.

In FIG. 1, a semiconductor layer 1 has two spaced substantially parallel principal surfaces. A metal grid, raster, lattice, array, or the like 2 of spaced parallel metal strips is provided on one of the two principal surfaces of the semiconductor layer 1.

Figure 2:
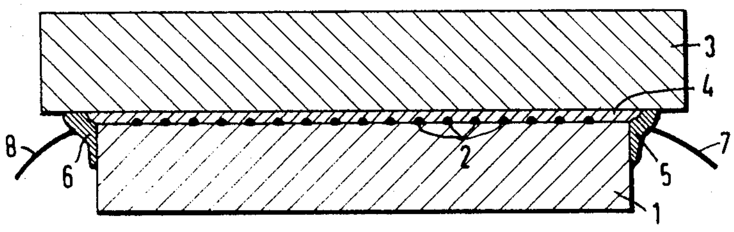
FIG. 2 is a sectional view of an embodiment of a galvanomagnetic resistor of the present invention.

In FIG. 2, the metal grid 2 is on the surface of the semiconductor layer 1 which faces the surface of a carrier plate 3. The metal grid 2 functions to short circuit the Hall voltage in the semiconductor layer 1. The semiconductor layer 1 is affixed to the carrier plate 3 by a suitable adhesive 4 with the grid 2 interposed between said semiconductor layer and said carrier plate. A pair of electrical contacts 5 and 6 and their corresponding electrically conducting terminal loads 7 and 8 are provided on the semiconductor layer 1.

The other of the two principal surfaces of the semiconductor layer 1, which is the free surface of said semiconductor layer may be subjected to a process of polishing and/or etching which reduces considerably the thickness of said semiconductor layer between its two principal surfaces. In the galvanomagnetic resistor of FIG. 3, the semiconductor layer 10 is the semiconductor layer 1 of FIG. 2 polished down to a desired determined thickness.

Figures 3, 4:
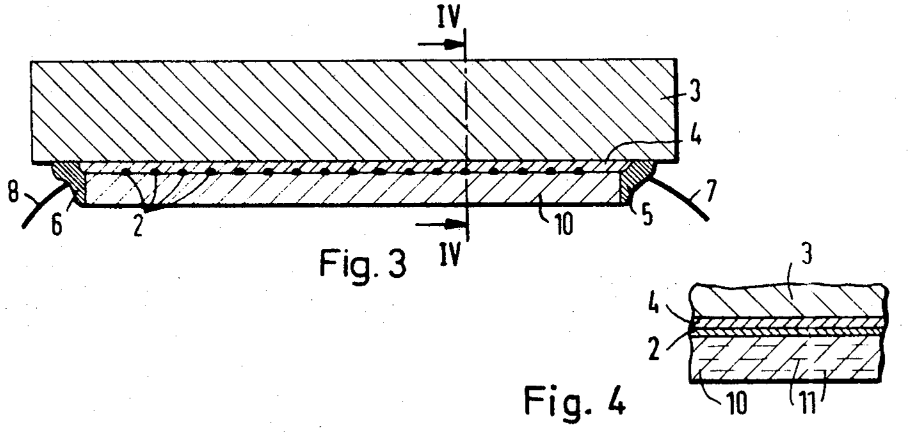
FIG. 3 is a modification of the embodiment of FIG. 2 wherein the semiconductor layer has been polished to a desired thickness.
FIG. 4 is a view taken along the lines IV–IV of FIG. 3.

The semiconductor layer 1 may comprise indium antimonide and the grid 2 may comprise indium. The semiconductor layer, as shown in FIG. 4, may include a plurality of inclusions 11 of good electrical conductivity. The inclusions 11 of good electrical conductivity are oriented approximately parallel to each other and to the grid 2, as shown in FIG. 4. The inclusions 11 may comprise, for example, nickel antimonide.

The grid, raster, lattice, array, or the like 2 may be of any desired suitable configuration. The grid 2 may thus comprise a plurality of spaced substantially parallel metal strips as shown, or metal of zigzag, sawtooth or irregular configuration. The grid comprises metal of good electrical conductivity such as, for example, silver or indium. Indium is especially suitable, since it may be readily alloyed with a semiconductor layer of indium antimonide.

The material of the semiconductor layer may be any suitable material such as, for example, the $A_3B_5$ compounds of the third and fifth groups of the periodic table such as indium antimonide or indium arsenide. The grid is affixed to the semiconductor layer by any suitable means such as, for example, an adhesive, vapor deposition, electrolytic application or alloying.

The method of the present invention as described, comprises mounting the semiconductor layer 1 or 10 on the carrier plate 3 with the metal grid 2 on said semiconductor layer interposed between the semiconductor layer and the carrier plate. Upon completion of the galvanomagnetic resistor, the free surface and the semiconductor layer 1 may be polished so that the thickness of said semiconductor layer is reduced to a desired magnitude, as in the semiconductor layer 10 (FIGS. 3 and 4). The free surface of the semiconductor layer may, of course, be etched in order to reduce the thickness of said semiconductor layer.

Prior to the present invention, it was hardly possible to alloy the indium grid with the indium antimonide semiconductor layer at the required temperature, as in the present invention. In fact, in the galvanomagnetic resistors of the prior art, the semiconductor layer was first affixed to the carrier plate by a suitable adhesive, cement or the like, prior to the placing of the grid, and such adhesive could not withstand the high temperatures required in an alloying process. If it was attempted to place the grid on the semiconductor layer prior to the affixing of said semiconductor layer to the carrier plate, a difficulty arose due to the fact that the required thickness of the semiconductor layer is between 10 and 20 microns. Due to the method of the present invention, a semiconductor layer of relative thickness may be provided with the grid, affixed to the carrier plate in the aforedescribed manner, and then reduced to the desired thickness by polishing or etching.

The strips of the grid 2 may be from 20 to 100 microns in width and from 5 to 8 microns in thickness and are not damaged or adversely affected by the polishing or etching of the semiconductor layer 1.

After the semiconductor layer has been polished to reduce its thickness, it is provided with terminal electrodes. The galvanomagnetic resistor is then dipped into an etching solution and its electrical resistance is measured after the completion of the etching process which occurs due to such dipping. The measurement of the electrical resistance is undertaken while the semiconductor layer is immersed in a constant temperature chemically neutral bath. The etching process and the electrical resistance-measuring process may then be repeated until the electrical resistance of the semiconductor layer reaches a determined magnitude.

While the invention has been described by means of a specific example and in a specific embodiment, I do not wish to be limited thereto, for obvious modifications will occur to those skilled in the art without departing from the spirit and scope of the invention.

I claim:

1. A method of making a galvanomagnetic resistor comprising:
   affixing a metal grid on a semiconductor layer; and
   affixing the semiconductor layer on a carrier plate with the metal grid on the semiconductor layer interposed between the semiconductor layer and the carrier plate.

2. A method as claimed in claim 1, wherein said grid is on a surface of the semiconductor layer facing the carrier plate and said semiconductor layer has another surface, and further comprising polishing the other surface of said semiconductor layer.

3. A method as claimed in claim 1, wherein said grid is alloyed with said semiconductor layer.

4. A method as claimed in claim 1, wherein said grid is on one of two surfaces of the semiconductor layer, said one surface facing the carrier plate, and further comprising etching the other of the surfaces of said semiconductor layer.

5. A method as claimed in claim 1, wherein the metal grid is first placed on the semiconductor layer and the semiconductor layer is then affixed to the carrier plate with the grid interposed between said semiconductor layer and said carrier plate.

6. A method as claimed in claim 1, wherein said grid is on one of two surfaces of the semiconductor layer, said one surface facing the carrier plate, and further comprising polishing the semiconductor layer to a desired thickness at the other of its surfaces.

7. A method as claimed in claim 1, polishing the semiconductor layer, affixing terminal electrodes to said semiconductor layer, dipping the polished semiconductor layer into an etching solution, immersing said semiconductor layer in a constant temperature chemically neutral bath and measuring the electrical resistance of the semiconductor layer after dipping while in said bath, and alternately repeating dipping into an etching solution and measuring the electrical resistance until the electrical resistance reaches a determined magnitude.